US006398416B1

(12) United States Patent
Kurz et al.

(10) Patent No.: US 6,398,416 B1
(45) Date of Patent: Jun. 4, 2002

(54) SINTERED FRICTION BEARING FOR MOTORS AND GEARS

(75) Inventors: Guido Kurz, Langerring; Thomas Broghammer, Aichhalden, both of (DE)

(73) Assignee: Karl Simon GmbH & Co. KG, Aichhalden (DE)

( * ) Notice: Subject to any disclaimer, the term of this patent is extended or adjusted under 35 U.S.C. 154(b) by 52 days.

(21) Appl. No.: 09/678,219

(22) Filed: Oct. 2, 2000

(30) Foreign Application Priority Data

Oct. 2, 1999 (DE) .......................... 199 47 462

(51) Int. Cl.[7] ............................................. F16C 33/10
(52) U.S. Cl. ...................... 384/279; 384/292; 384/902
(58) Field of Search ................................ 384/100, 114, 384/118, 279, 902, 291, 292

(56) References Cited

U.S. PATENT DOCUMENTS

| | | | | |
|---|---|---|---|---|
| 2,153,397 A | * | 4/1939 | Sandler | 384/279 |
| 5,704,718 A | | 1/1998 | Mori et al. | |
| 5,785,429 A | * | 7/1998 | Jeong | 384/279 |
| 6,244,749 B1 | * | 6/2001 | Nakagawa et al. | 384/114 |
| 6,270,259 B1 | * | 8/2001 | Burton | 384/902 |

FOREIGN PATENT DOCUMENTS

JP  8-68423  * 3/1996

OTHER PUBLICATIONS

German Publication "Tribologie+Schmierungstechnik" [Tribology and Lubrication Technology], vol. 45, Jan. 1998, pp. 47/48.

* cited by examiner

Primary Examiner—David A. Bucci
Assistant Examiner—William C Joyce
(74) Attorney, Agent, or Firm—Pauley Petersen Kinne & Erickson

(57) ABSTRACT

A sintered friction bearing for motors and gears with a bearing surface, which is formed by a bearing bore and can have a lubricant from lubricant depositories in the bearing. The bearing bore has alternating highly compressed, small-pored bearing surfaces distributed over the circumference and slightly compressed, open-pored lubricant depositories from one front face to the other front face of the bearing. Lubrication of the sintered friction bearing is improved because the lubricant depositories are embodied as grooved structures with at least two longitudinal grooves, which are inclined at an acute angle with respect to a center axis of the bearing bore from one front face to another front face of the bearing.

11 Claims, 1 Drawing Sheet

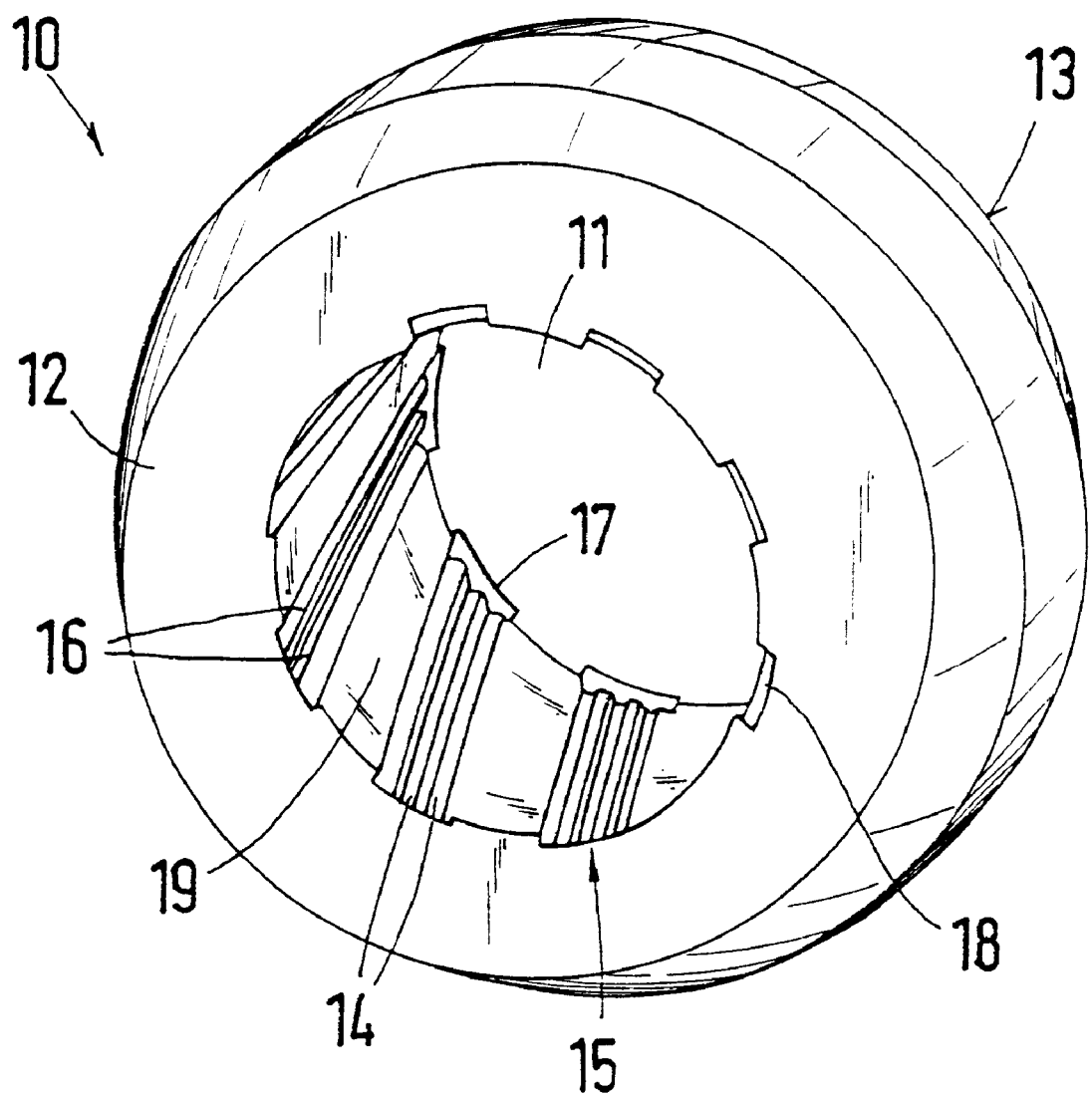

SINTERED FRICTION BEARING FOR MOTORS AND GEARS

BACKGROUND OF THE INVENTION

1. Field of the Invention

This invention relates to a sintered friction bearing for motors and gears with a bearing surface, which has a bearing bore and can have a lubricant from lubricant depositories in the bearing. The bearing bore has alternating highly compressed, small-pored bearing surfaces distributed over the circumference and slightly compressed, open-pored lubricant depositories from one front face to the other front face of the bearing.

2. Description of Related Art

A sintered friction bearing is known from the German Publication "Tribologie+Schmierungstechnik"[Tribology and Lubrication Technology], vol. 45, 1/1988, pp. 47/48. The lubricant depositories are cut in the form of grooves of triangular cross section into the bearing bore of the sintered body, while the bearing surfaces between the grooves are compressed by roll drafting. These lubricant depositories are able to receive lubricants, which during operation are exuded from the sintered bearing, for example are displaced from the not so highly compressed areas. Because the grooves are axially oriented and are arranged at some distance from each other and also have a large width, the lubricating effect is not evenly distributed over the entire bearing surface of the bearing bore, and is insufficient in the start-up phases in particular.

This also correspondingly applies to a sintered bearing in accordance with U.S. Pat. No. 5,704,718, wherein the lubricant depositories are formed by large, U-shaped grooves each having a groove bottom set off by a larger diameter in comparison with the bearing surfaces. The lubricant stored in these grooves during stopping cannot effectively aid lubrication during the start-up phases of the operation. The lubricant depositories first must be filled with lubricant before they are an effective part of the lubrication of the shaft.

SUMMARY OF THE INVENTION

It is one object of this invention to improve lubricating action of lubricant depositories in a sintered friction bearing of the type mentioned above but in such a way that, regardless of the installed position of the bearing, at least a portion of the circumferential surface of the shaft is always connected with a lubricant depository.

In accordance with this invention, this object is attained with lubricant depositories embodied as grooved structures with at least two longitudinal grooves, which are inclined at an acute angle with respect to the center axis of the bearing bore from front face to front face of the bearing.

Because of the inclined orientation of the grooved structures, the strips of bearing surfaces between the front faces of the bearing can be lined up with their ends, so that a shaft inserted into the bearing bore is always in at least partial contact with a lubricant depository, over the entire circumference of the shaft. Thus the lubricating action of the lubricant depository is considerably improved, and the sintered bearing is sufficiently lubricated, regardless of its position with respect to the shaft.

If in accordance with one embodiment, the longitudinal grooves of the grooved structures are closed in the area of their front faces. The lubricant received in the longitudinal grooves of the grooved structures cannot exit from the bearing and is completely available for lubricating the shaft.

In accordance with a simple embodiment, the longitudinal grooves can be closed by deformed portions of the sintered bearing.

In accordance with a further embodiment, distribution of the lubricant over the entire circumferential surface of the shaft can be improved because the ends of adjoining grooved structures overlap at least partially at the two front faces.

Cutting the grooved structures into the bearing bore is simplified because the grooved structures are arranged at the same distance from each other and therefore in the same angular range, so that the angle position of the cutting tool can be maintained.

The grooved structures are completed because the longitudinal grooves are separated from each other by groove caps in non-bearing contact with the shaft inserted into the bearing groove, but at least partially contact the shaft, for transferring lubricant. Thus the lubrication of the shaft in the start-up phases of operation is improved because of the lubrication by the porous groove caps.

In one embodiment the size of the groove structures is distinguished because the longitudinal grooves have a depth of up to 0.5 mm and a width in the area of the bearing bore of 0.30 to 0.50 mm, wherein the radii of the longitudinal grooves are at least 0.05 mm, and the groove caps are of the same size in a laterally reversed manner.

BRIEF DESCRIPTION OF THE DRAWINGS

This invention will be explained in greater detail in view of an exemplary embodiment represented in the drawings, wherein the single drawing FIGURE represents a perspective view of a sintered friction bearing.

DESCRIPTION OF PREFERRED EMBODIMENTS

A sleeve-shaped sintered friction bearing 10, having two front faces 12 and 13, has a bearing bore 11, in which grooved structures 15 with longitudinal grooves 14 and groove caps 16 alternate with strips of bearing surfaces 19. The groove structures 15 with the longitudinal grooves 14 and groove caps 16 are slightly compressed and therefore open-pored, so that they act as storage spaces for lubricant. The strips of bearing surfaces 19 are highly compressed by means of roll drafting and therefore have small pores, so that they form wear-resistant bearing surfaces for the shaft. But their capability of storing lubricant is very limited.

The grooved structures 15 are formed by at least two longitudinal grooves 14, three in the exemplary embodiment, which are separated from each other by groove caps 16. The groove caps 16 are designed laterally reversed with respect to the longitudinal grooves 14 and are correspondingly dimensioned. Thus, the longitudinal groove 14 can have a depth of up to 0.50 mm and a width between 0.30 to 0.50 mm. The radii of the longitudinal grooves 14 and of the groove caps 16 can be at least 0.05 mm. The groove caps 16 are slightly compressed and contact the shaft in a non-bearing manner in order to achieve a lubricating effect for the shaft also in the start-up phases of operation.

The grooved structures 15 do not extend parallel with the center axis of the bearing bore 11, but are inclined at an acute angle with respect to it. In this case the oppositely located ends of adjoining groove structures 15 are lined up with each other at both front faces 12 and 13. The inclination of the grooved structures 15 can also be selected so that the oppositely located ends of adjoining groove structures overlap at least partially at the front faces 12 and 13. Therefore, the shaft inserted into the bearing bore 11 always contacts a partial area of its circumferential surface with a grooved structure 15, and therefore lubrication always extends over at least a portion of the entire circumference of the shaft. The longitudinal grooves 14 are closed on both front faces 12 and 13 of the sintered friction bearing 10, as indicated by the deformed parts 17 and 18 of the front faces 12 and 13. This can be achieved with an upsetting deformation process after the longitudinal grooves 14 are cut.

The exterior edges of the front phase 12 and 13 of the sintered friction bearing can be inclined by means of a bevel.

What is claimed is:

1. In a sintered friction bearing for motors and gears having a bearing surface formed by a bearing bore and can be supplied with a lubricant from lubricant depositories in the bearing, wherein the bearing bore has alternating highly compressed, small-pored bearing surfaces distributed over a circumference, and slightly compressed open-pored lubricant depositories from one front face to another. front face of the bearing, the improvement comprising:

the lubricant depositories embodied as a plurality of grooved structures (15) each having at least two longitudinal grooves (14) inclined at an acute angle with respect to a center axis of the bearing bore (11) from a first front face (12) to a second front face (13) of the bearing (10).

2. In the sintered friction bearing in accordance with claim 1, wherein the longitudinal grooves (14) of the grooved structures (15) each have a closed part (17, 18) in an area of the first and the second front faces (12, 13).

3. In the sintered friction bearing in accordance with claim 2, wherein the longitudinal grooves (14) are closed by a plurality of deformed portions (17, 18) of the bearing (10).

4. In the sintered friction bearing in accordance with claim 3, wherein ends of adjoining ones of the grooved structures (15) overlap at least partially at the first and the second front faces (12, 13).

5. In the sintered friction bearing in accordance with claim 4, wherein the grooved structures (15) are arranged at a same distance from each other and in a same angular range.

6. In the sintered friction bearing in accordance with claim 5, wherein the longitudinal grooves (14) are separated from each other by a groove cap (16), and the groove cap (16) is non-bearing but at least partially in contact with a shaft introduced into the bearing bore (11) for transferring lubricant.

7. In the sintered friction bearing in accordance with claim 6, wherein the longitudinal grooves (14) each have a depth of up to 0.5 mm and a width in an area of the bearing bore (11) of 0.30 mm to 0.50 mm, and the groove cap.

8. In the sintered friction bearing in accordance with claim 1, wherein ends of adjoining ones of the grooved structures (15) overlap at least partially at the first and the second front faces (12, 13).

9. In the sintered friction bearing in accordance with claim 1, wherein the grooved structures (15) are arranged at a same distance from each other and in a same angular range.

10. In the sintered friction bearing in accordance with claim 1, wherein the longitudinal grooves (14) are separated from each other by a groove cap (16), and the groove cap (16) is non-bearing but at least partially in contact with a shaft introduced into the bearing bore (11) for transferring lubricant.

11. In the sintered friction bearing in accordance with claim 1, wherein the longitudinal grooves (14) each have a depth of up to 0.5 mm and a width in an area of the bearing bore (11) of 0.30 mm to 0.50 mm. and a.

* * * * *